(12) United States Patent
Schouten (10) Patent No.: US 9,176,972 B1
(45) Date of Patent: Nov. 3, 2015

(54) IMPLIED M83 NAMES IN ALTERNATE NAME GENERATION IN DIRECTORIES SUPPORTING MULTIPLE NAMING PROTOCOLS

(71) Applicant: EMC Corporation, Hopkinton, MA (US)

(72) Inventor: Michael D. Schouten, Lake Katrine, NY (US)

(73) Assignee: EMC Corporation, Hopkinton, MA (US)

( * ) Notice: Subject to any disclaimer, the term of this patent is extended or adjusted under 35 U.S.C. 154(b) by 324 days.

(21) Appl. No.: 13/716,589

(22) Filed: Dec. 17, 2012

(51) Int. Cl.
*G06F 17/30* (2006.01)

(52) U.S. Cl.
CPC .... *G06F 17/30123* (2013.01); *G06F 17/30091* (2013.01); *G06F 17/30115* (2013.01)

(58) Field of Classification Search
CPC .................. G06F 17/30123; G06F 17/30115
USPC .......................................... 707/823, 828–829
See application file for complete search history.

(56) References Cited

U.S. PATENT DOCUMENTS

| 5,579,517 A | 11/1996 | Reynolds et al. |
| 7,451,153 B2 | 11/2008 | Inkinen |
| 2008/0313216 A1* | 12/2008 | Kobayashi .................... 707/102 |

* cited by examiner

*Primary Examiner* — Thu-Nguyet Le
(74) *Attorney, Agent, or Firm* — BainwoodHuang (57) ABSTRACT

An improved technique involves providing a naming scheme that uses a unique numeric identifier associated with a particular naming protocol. Along these lines, when a storage processor receives a first name of a file that conforms to a first naming protocol, the storage processor places the first name and an inode number corresponding to the file in a directory entry. The storage processor associates this entry with a unique numeric identifier by which the entry can be located within the directory. Based on this unique identifier, the storage processor is configured to generate the second name that conforms to the second naming protocol.

20 Claims, 5 Drawing Sheets

IMPLIED M83 NAMES IN ALTERNATE NAME GENERATION IN DIRECTORIES SUPPORTING MULTIPLE NAMING PROTOCOLS

BACKGROUND

Some filenames satisfy particular naming protocols. For example, suppose that a user on a computer running a Unix® operating system accesses a particular text file by referring to the string "root/user/TextFileInTheUserDirectory.txt". In this case, the filename "TextFileInTheUserDirectory.txt" satisfies a Unix naming protocol that requires, for example, a 255-byte limit to filename length with case sensitivity. Other naming protocols include the Microsoft® Windows, or M256, naming protocol having a limit of 255 case insensitive Unicode characters in filename length with a list of reserved characters, and the DOS, or M83, naming protocol having a filename limit of twelve case-insensitive characters, with 8 characters for a base name, 3 characters reserved for an extension, and a "." separating the base name and the extension. (In other words, a DOS filename takes the form "xxxxxxxx.yyy," where the x's and y's represent ASCII characters.)

Some directories are multiprotocol in that they support multiple naming protocols. That is, a multiprotocol directory supports access to a single file by users on computers running different operating systems, each of which supports different naming protocols. For example, a first user on a computer running Unix and a second user on a computer running Windows may both be able to access the single file. Along these lines, the directory maps each of these filenames to the same inode number.

In response to the naming of a file in one naming protocol, a file system containing a multiprotocol directory may create equivalent filenames in each of the other naming protocols it supports. Along these lines, suppose that a user creates the following filename for a file on a computer running Windows: "TextFileInTheUserDirectory.txt". The computer would then translate this name into, say, Unix and DOS according to the rules governing the respective naming protocols. In a conventional naming process, the conversion from a longer M256 or Unix filename to a shorter M83 filename involves truncating the longer filename to at most eight characters, such as in "TEXTFI~1.TXT". Other rules govern M256 filenames that have characters reserved in DOS.

SUMMARY

In the above-described conventional naming process, there is a chance that a derived M83 filename may collide with an existing M83 filename. Consequently, when the file system is ready to create an M83 filename from an M256 filename, the file system generates a series of alternate, mangled M83 filenames according to a mangling rule. The file system then searches existing names in the directory for a collision. If there is a collision, then the file system selects the next M83 filename, and repeats until there is no collision or until a threshold number of M83 names have been tried.

Unfortunately, there are deficiencies with this naming process. For example, for a very large directory that contain millions of files, the searching operation for collisions becomes unwieldy and takes a large amount of processing resources to carry out. Also, the naming consumes significant processor resources in deriving M83 filenames from M256 filenames. Moreover, the derived M83 filenames use disk space that could be used to store file contents.

In contrast to the conventional file system in which the derivation of an M83 filename from the M256 filename of a file takes up both processor and disk resources, an improved technique involves providing a naming scheme that uses a unique numeric identifier associated with a particular naming protocol. Along these lines, when a storage processor receives a first name of a file that conforms to a first naming protocol, the storage processor places the first name and an inode number corresponding to the file in a directory entry. The storage processor associates this entry with a unique numeric identifier by which the entry can be located within the directory. Based on this unique identifier, the storage processor is configured to generate the second name that conforms to the second naming protocol.

Advantageously, the improved technique allows for the generation of short filenames while using zero processor and disk resources. The reason for this lies in the fact that the second name is based on an already an existing unique numeric identifier. Because this numeric identifier is unique, a sufficiently simple lookup operation based on the address will also be unique. Thus, the storage processor needs to expend no effort to check for possible collisions. Further, the second name does not need to be stored in disk because the second name is a deterministic function of the unique address.

One embodiment of the improved technique is directed to a method of providing access to directory objects of a directory of a disk file system of a disk. The method includes receiving a naming request to create an entry of the directory of the disk file system, the naming request including a name identifying a directory object, the name conforming to a particular naming protocol. The method also includes producing, from the name, the entry of the directory of the disk file system, the entry having a unique numeric identifier, the unique numeric identifier being a key associated with the particular naming protocol by which the entry can be located within the disk file system.

Additionally, some embodiments of the improved technique are directed to a system constructed and arranged to provide access to directory objects of a disk file system directory of a disk. The system includes a network interface, memory, and a controller including controlling circuitry constructed and arranged to carry out the method of providing access to directory objects of a directory of a disk file system of a disk.

Furthermore, some embodiments of the improved technique are directed to a computer program product having a non-transitory computer readable storage medium which stores code including a set of instructions to carry the method of providing access to directory objects of a directory of a disk file system of a disk.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves providing a naming scheme that uses a unique numeric identifier associated with a particular naming protocol. Along these lines, when a storage processor receives a first name of a file that conforms to a first naming protocol, the storage processor places the first name and an inode number corresponding to the file in a directory entry. The storage processor associates this entry with a unique numeric identifier by which the entry can be located within the directory. Based on this unique identifier, the storage processor is configured to generate the second name that conforms to the second naming protocol.

Advantageously, the improved technique allows for the generation of short filenames while using zero processor and disk resources. The reason for this lies in the fact that the second name is based on an already an existing unique numeric identifier. Because this numeric identifier is unique, a sufficiently simple lookup operation based on the address will also be unique. Thus, the storage processor needs to expend no effort to check for possible collisions. Further, the second name does not need to be stored in disk because the second name is a deterministic function of the unique address.

Figure 1:
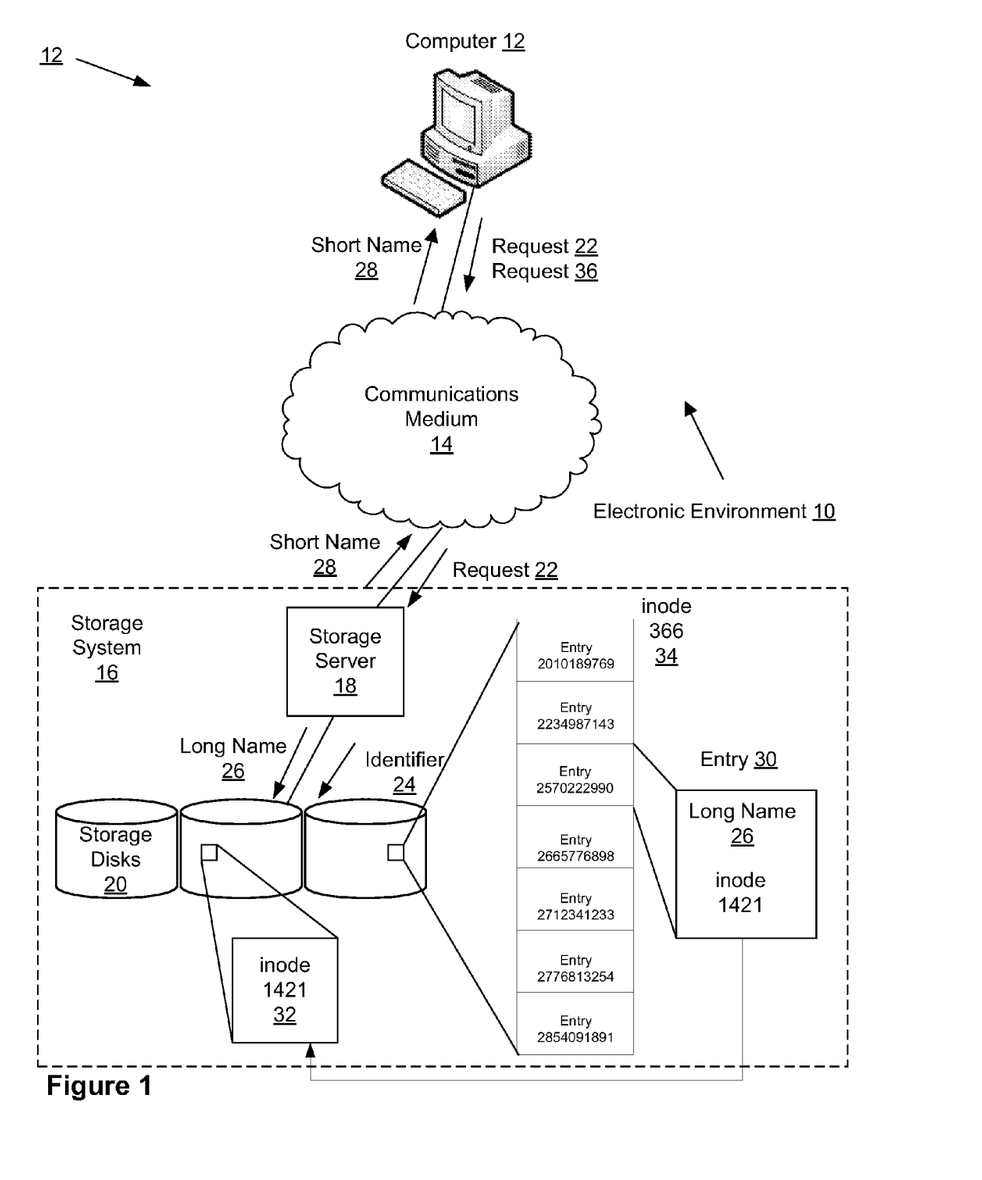
FIG. 1 is a block diagram illustrating an example electronic environment for carrying out the improved technique.

FIG. 1 illustrates an example electronic environment 10 for carrying out the improved technique. Electronic environment 10 includes computer 12, communications medium 14, and storage system 16.

Computer 12 takes the form of desktop computers running microprocessing units (MPUs) configured to run software on a particular operating system. For example, computer 12 is configured to run a version of Microsoft Windows (e.g., Windows 7) that uses an M256 naming convention. In some arrangements, computer 12 is configured to receive filenames in the IM83 naming convention described below as well.

Communication medium 14 provides network connections between computer 12 and storage system 16. Communications medium 14 may implement a variety of protocols such as TCP/IP, UDP, ATM, Ethernet, Fibre Channel, combinations thereof, and the like. Furthermore, communications media 14 may include various components (e.g., cables, switches/routers, gateways/bridges, NAS/SAN appliances/nodes, interfaces, etc.). Moreover, the communications medium 14 are capable of having a variety of topologies (e.g., queue manager-and-spoke, ring, backbone, multi drop, point to-point, irregular, combinations thereof, and so on).

Storage system 16 is configured to store files (not pictured) and provide a user at computer 12 access to those files via communication medium 14. Storage system 16 includes storage server 18 and storage disks 20.

Storage server 18 is constructed and arranged to receive filenames in IM83, M256, and Unix naming protocols from computers 12 and locate files based on those filenames. Storage server 18 is also constructed and arranged to generate, from a filename conforming to a first naming protocol, another filename conforming to a second protocol.

During operation, a user (not pictured) at computer 12 sends a naming request 22 to storage system 16 in order to associate a long name 26 conforming to the M256 protocol with a particular file (not shown). It should be understood that, in this example, it is assumed that the particular file is being created in disk by virtue of naming request 22. In some arrangements, however, naming request 22 may be sent as part of a renaming of an existing file.

Storage server 18 receives naming request 22 and creates space for the file contents and an inode 32 that is configured to provide locations of the blocks of storage of storage disk 20 at which the contents of the particular file are stored. The contents of the particular file may or may not be stored in a contiguous block of memory on storage disks 20. In this example, inode 32 of the particular file has an inode number of 1421, which denotes a location in memory where the inode of the particular file is stored.

Storage server 18 produces, from long name 26, a directory entry 30 in a directory inode 34. For example, storage server constructs directory entry 30 within directory inode 34 having inode number 366. Associated with directory entry 30 is a unique numerical identifier 24, illustrated here by the number 2570222990. In some arrangements, directory inode 34 includes a set of directory entries, each associated with unique numeric identifiers, such that the entries within directory inode 34 are arranged in numerical order.

Directory entry 30 has a record and keys by which the record may be recovered. In FIG. 1, the record of directory entry 30 is an inode number (1421) at which metadata describing the file associated with long name 26 is stored.

In response to a request 36 from a user at computer 12 for a short name conforming to the M83 protocol, storage server 18 generates a short name 28 from unique identifier 24. In some arrangements, storage processor 24 generates short name 28 from identifier 24 and contents of directory entry 30. Upon generating short name 28, storage server sends short name 28 to computer 12.

It should be understood that storage server 18 does not store short name 28 on storage disks 20. Rather, storage server 18 uses already-existing identifier 24 to quickly determine short name 28. Further details of how storage server 18 determines short name 28 will be discussed below with respect to FIG. 3.

It should also be understood that storage server 18 should generate short name 28 in such a way as to facilitate the acquisition of the contents of the particular file by computer 12. Details of such an acquisition will be discussed below with respect to FIG. 4.

Further details of storage server 18 will be discussed below with respect to FIG. 2.

Figure 2:
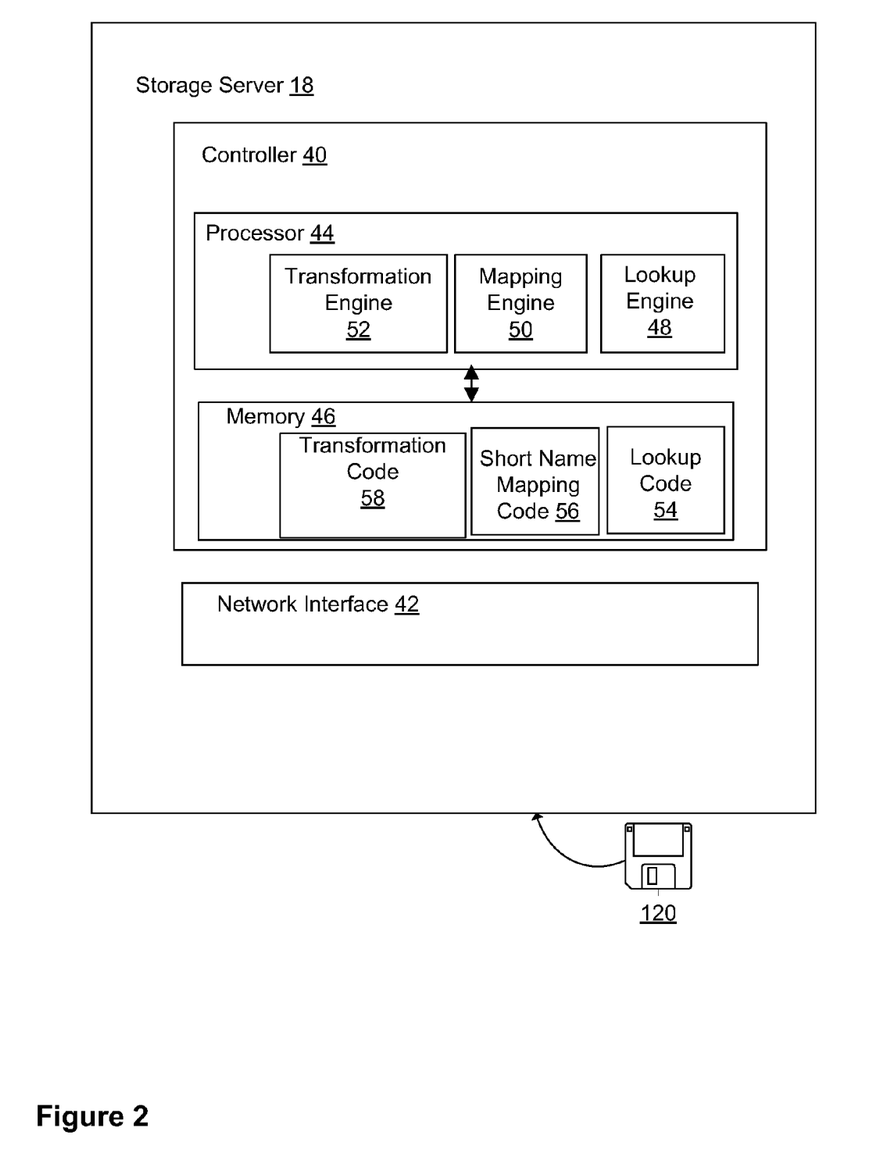
FIG. 2 is a block diagram illustrating an example storage server within the electronic environment shown in FIG. 1.

FIG. 2 illustrates further details of an example storage server 18. Storage server 18 includes controller 40 which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code which includes lookup code 54 configured to perform find inode numbers of a file from a short name, short name mapping code 56 configured to map unique identifiers to short names, and transformation engine 52 configured to apply a transformation function to a unique identifier and directory entry contents to produce a short name. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from lookup 54, mapping code 56, and transformation code 58. Processor 44 includes lookup engine 48, mapping engine 50, and transformation engine 52 for executing these instructions, respectively.

During operation, processor 44 receives, via network interface 42, naming request 22 (see FIG. 1). Processor 44 then produces directory entry 30 for long name 26 extracted from naming request 22. Sometime later, processor 44 receives a request to view short name 28 for the file associated with long name 36. In response, mapping engine 50 generates short name 28 using unique identifier 24, long name 26, and the inode number. Further details of the generation of short name 28 from unique identifier 24 via mapping engine 50, are discussed below with respect to FIG. 3.

Figure 3:
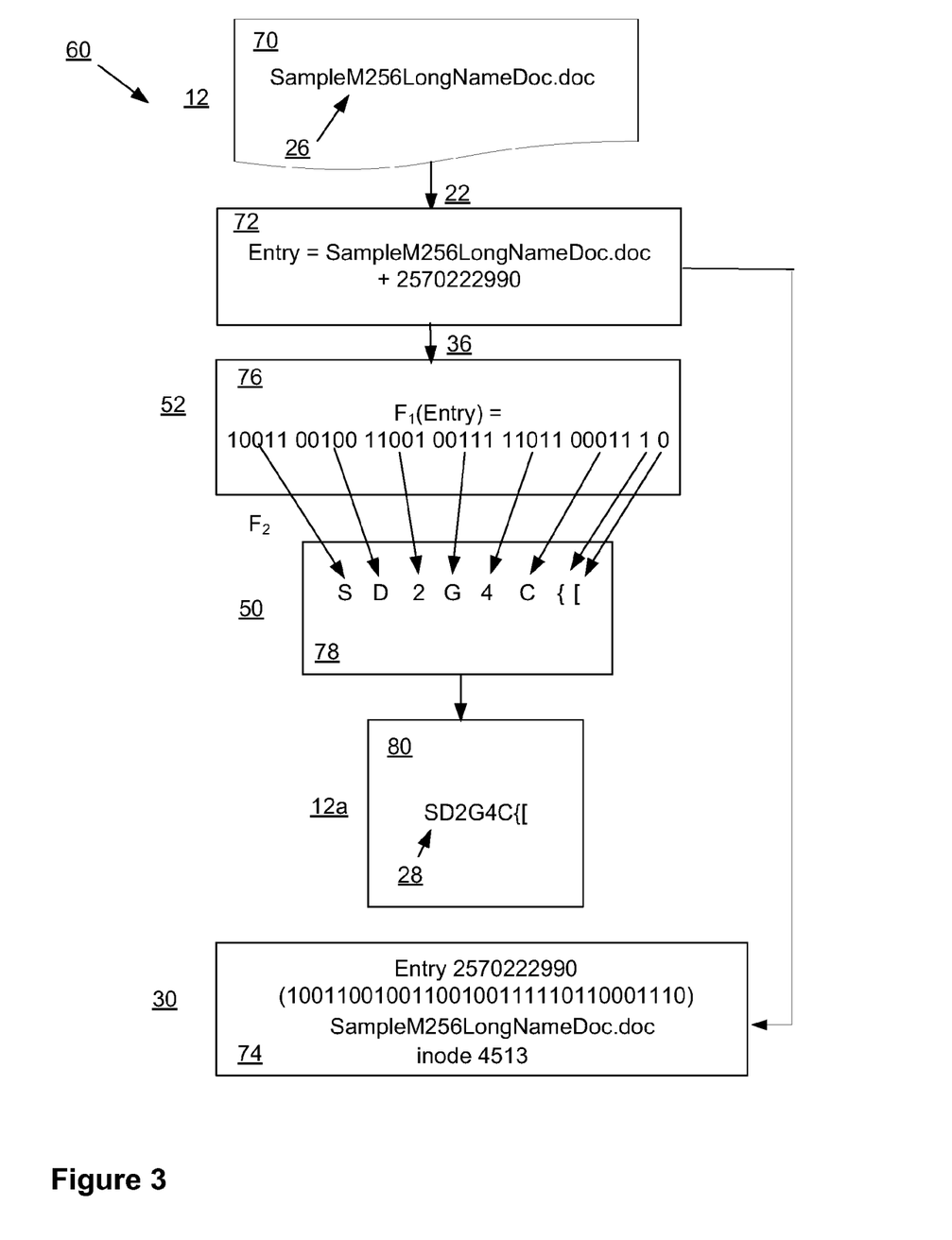
FIG. 3 is a flow chart illustrating an example process of generating an IM83 name from an M256 name within the electronic system shown in FIG. 1.

FIG. 3 illustrates an example process 60 by which processor 44 generates short name 28 from long name 26 according to the improved technique. Process 60 includes steps 70, 72, 74, 76, and 78, each of which is described as follows.

In step 70, computer 12 adds long name 26 to naming request 22. In this case, long name 26 is "SampleM256LongName.doc".

In step 72, processor 44 produces directory entry 30 for long name 26 extracted from naming request 22.

In step 74, processor 44 maps long filename 26 to inode having an inode number 4513. Processor 44 then stores, as a directory entry, long filename 26 and the corresponding inode number on storage disks 20 at a location specified by unique identifier 24. That is, unique identifier 24 is a numerical value associated with directory entry 30 within directory inode 34 at which processor 44 stores the directory entry.

In step 76, in response to request 36 to view a short name, transformation engine 52 references a transformation function $F_1$ to unique identifier 24 determined by entry 30. That is, transformation function $F_1$ is a deterministic function of a numeric bit string equivalent to the string, and produces unique identifier 24, expressed in FIG. 3 as a 32-bit binary representation. In other arrangements, the output is 64 bits. It should be understood that, as unique identifier 24 already exists, transformation function $F_1$ provides a map between entry 30 and unique identifier 24.

In step 78, mapping engine 50 applies a map $F_2$ of the output of the transformation function $F_1$ to short name 28. In FIG. 3, mapping engine 50 splits the 32-bit number into six segments of five bits each and two segments of one bit each. For each of the five-bit segments, mapping engine 50 selects one of 32 case-insensitive, ASCII characters. For example, mapping engine 50 selects either a letter from A-V or a number from 0-9 for a 5-bit segment. As an illustration, mapping engine 50 would assign 'A' to the value 00000, 'B' to 00001, and so on through '9' to 11111. In addition, for each of the one-bit segments, mapping engine 50 selects one of two reserved characters. For example, to the bit value 0, mapping engine 50 assigns the character '{', while for the bit value 1 mapping engine assigns the character '['. For the example shown in FIG. 3 and discussed above, mapping engine 50 maps identifier 24 to the characters 'S', 'D', '2', 'G', '4', 'C', '{', and '[', in order. This name is an example of a name conforming to the IM83 naming protocol.

In step 80, mapping engine 50 concatenates the above characters to form short filename 28 "SD2G4C{[". Processor 44 then sends short name 28 to computer 12 as fulfillment of the request 36.

It should be understood that computer 12 may need to access a file from short name 28. Details of a process used in such access are described below with respect to FIG. 4.

Figure 4:
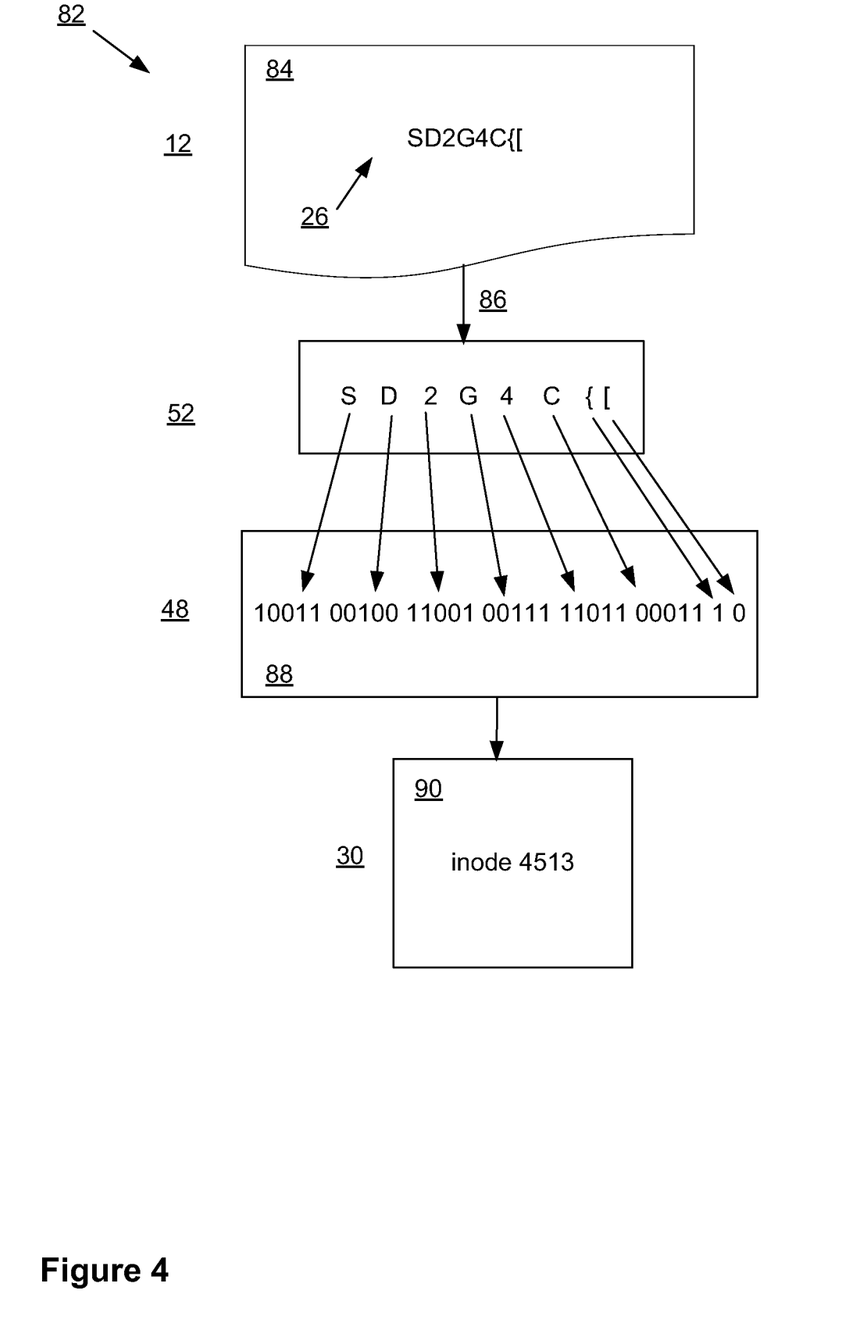
FIG. 4 is a flow chart illustrating an example process of performing a lookup operation for an inode number from an IM83 name within the electronic system shown in FIG. 1.

FIG. 4 describes a process 82 by which computer 12 accesses a file using short name 28. Process 82 includes steps 84, 88, and 90, each of which is described as follows.

In step 84, computer 12 sends a request 86 to access the file indicated by short name 28 to processor 44 (see FIG. 2). This illustration continues the example above, and short name 28 is "SD2G4C{[".

In step 88, upon receiving request 86 and verifying that short name 28 is a legal IM83 name, lookup engine 48 parses short filename 28 into its component characters. For each of the first six characters, lookup engine 48 performs a reverse mapping of the character into a five-bit segment as described with respect to FIG. 3 above. For each of the last two characters, lookup engine 48 performs a reverse mapping of the character to a bit value as described above. Lookup engine 48 then concatenates each of the five-bit and one-bit segments together in order to produce the 32-bit number described above. From this number, lookup engine deduces unique identifier 24.

In step 90, processor 44 obtains the inode number stored in directory entry 30 indicated by unique identifier 24. At this point, computer 12 is able to receive the contents of the file.

Figure 5:
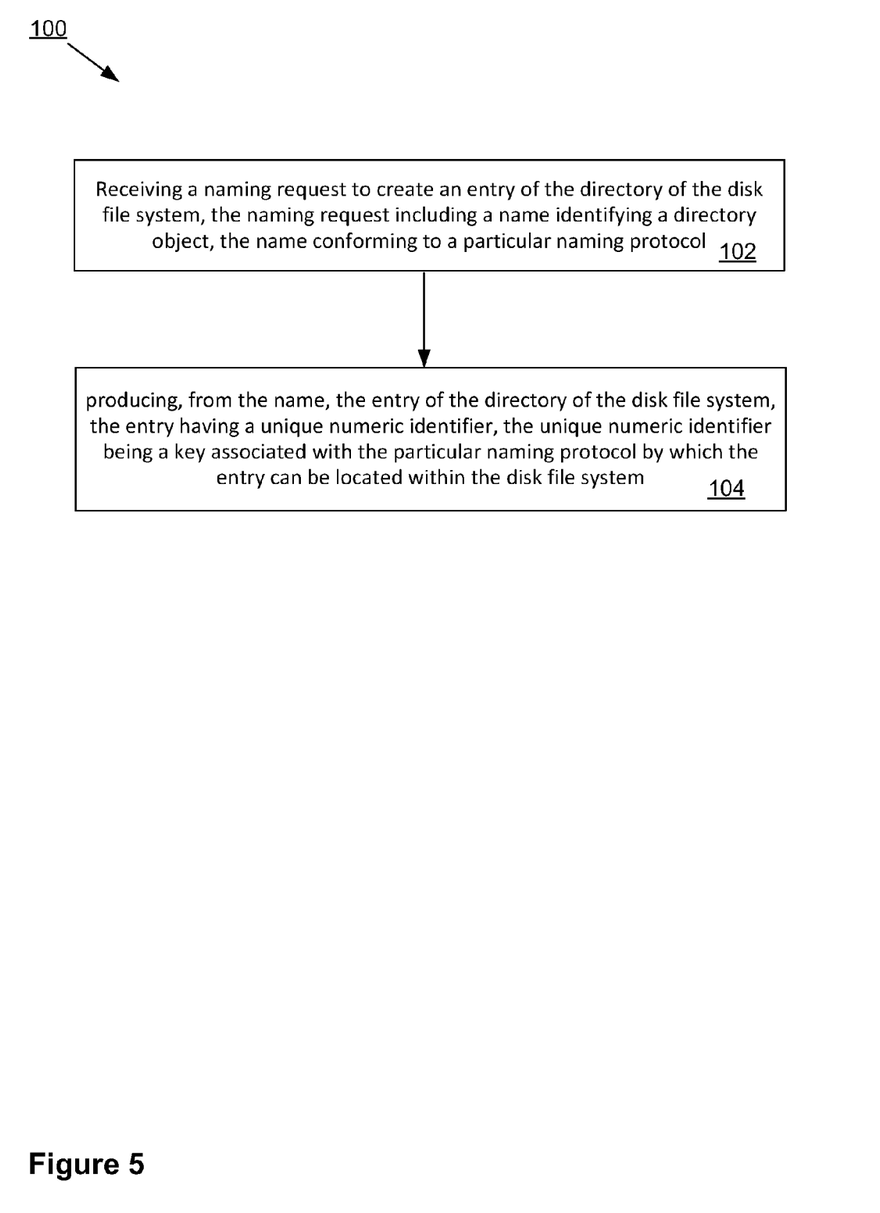
FIG. 5 is a flow chart illustrating a method of carrying out the improved technique within the electronic environment shown in FIG. 1.

FIG. 5 illustrates a method 100 of providing access to directory objects of a disk file system directory of a disk. Method 100 includes steps 102 and 104, each of which is described as follows. In step 102, a naming request to create an entry of the directory of the disk file system is received, the naming request including a name identifying a directory object, the name conforming to a particular naming protocol. In step 104, the entry of the directory of the disk file system is produced from the name, the entry having a unique numeric identifier, the unique numeric identifier being a key associated with the particular naming protocol by which the entry can be located within the disk file system.

While various embodiments of the invention have been particularly shown and described, it will be understood by those skilled in the art that various changes in form and details may be made therein without departing from the spirit and scope of the invention as defined by the appended claims.

For example, the above description assumed that the unique identifiers generated from long filenames are based on an offset of a memory location from a null location in the directory. In some arrangements, however, the unique identifiers are hashes of filenames in the directory.

Furthermore, it should be understood that some embodiments are directed to storage server 18, which is constructed and arranged to provide access to directory objects of a disk file system directory of a disk. Some embodiments are directed to a process of providing access to directory objects of a disk file system directory of a disk. Also, some embodiments are directed to a computer program product which enables computer logic to provide access to directory objects of a disk file system directory of a disk.

In some arrangements, storage server 18 is implemented by a set of processors or other types of control/processing circuitry running software. In such arrangements, the software instructions can be delivered, within storage server 18, in the form of a computer program product 120 (see FIG. 2), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of providing access to directory objects of a directory of a disk file system of a disk, the method comprising:

receiving a naming request to create an entry of the directory of the disk file system, the naming request including a name identifying a directory object, the name conforming to a particular naming protocol;
producing, from the name, the entry of the directory of the disk file system, the entry having a unique numeric identifier, the unique numeric identifier being a key associated with the particular naming protocol by which the entry can be located within the disk file system;
wherein receiving the naming request includes obtaining the naming request over a network, the naming request originating from a computer configured to send the naming request over the network.

2. A method as in claim 1,
wherein the directory of the disk file system is configured to allow names to conform to multiple naming protocols;
wherein the method further comprises:
receive a request from a user to obtain a second name that identifies the entry, the second name conforming to a second naming protocol that is different from the first naming protocol;
in response to the request, producing the second name from the unique numeric identifier; and
sending the second name to the user.

3. A method as in claim 2,
wherein producing the second name from the unique numeric identifier includes:
applying a transformation function to the entry to produce a numeric value, and
performing a translation operation of the numeric value to output the second name.

4. A method as in claim 3,
wherein performing the translation operation of the numeric value includes:
splitting the numeric value into a fixed number of numeric segments, each numeric segment having a particular number of bits;
mapping each numeric segment to a single character of a set of characters; and
concatenating characters of the set of characters to which the numeric segments were mapped to produce concatenated characters.

5. A method as in claim 4,
wherein splitting the numeric value into the fixed number of numeric segments includes:
providing each numeric segment of the fixed number of numeric segments with the particular number of bits, the number of bits being equal to the greatest integer less than the bit length of the hash value divided by the fixed number of hash segments; and
wherein performing the translation operation of the hash value further includes:
generating a set of remainder bits, the number of remainder bits in the set of remainder bits being equal to the remainder obtained from dividing the bit length of the hash value by the fixed number of numeric segments,
mapping each remainder bit of the set of remainder bits to one of a pair of remainder characters to produce a set of mapped remainder bits, and
concatenating the mapped remainder bits of the set of remainder bits to the concatenated characters to produce a fully mapped word, the second name including the fully mapped word.

6. A method as in claim 5, further comprising:
receiving a second naming request to access the directory object, the second naming request including the second name;
in response to the second naming request, applying an inverse mapping to the fully mapped word of the second name to produce the numeric value,
locating the entry of the directory of the disk file system from the numeric value, the unique numeric key of the entry being encoded within the numeric value, and
obtaining, as a record of the entry, the inode number associated with the directory object.

7. A method as in claim 6,
wherein applying the inverse mapping to the fully mapped word includes:
for each character of the concatenated characters from which the fully mapped word was produced, matching the character of the numeric segment to which the character was mapped,
for each remainder character from which the fully mapped word was produced, matching the remainder character to the remainder bit to which the remainder character was mapped, and
concatenating the numeric segments and remainder bits to form the numeric value.

8. A method as in claim 1, wherein the entry of the directory includes the particular filename and a pointer to a location in the disk at which the directory object is stored; and
wherein the method further comprises:
receiving a request from the computer to access the directory object, the request including another name, the other name conforming to another naming protocol; and
translating the other name into the unique numeric identifier of the entry, thereby finding the location in the disk at which the directory object is stored without requiring that the other name be included in the entry.

9. An electronic system constructed and arranged to provide access to directory objects of a disk file system directory of a disk, the system comprising:
memory; and
a controller including controlling circuitry coupled to the memory, the controlling circuitry being constructed and arranged to:
receive a naming request to create an entry of the directory of the disk file system, the naming request including a name identifying a directory object, the name conforming to a particular naming protocol; and
produce, from the name, the entry of the directory of the disk file system, the entry having a unique numeric identifier, the unique numeric identifier being a key associated with the particular naming protocol by which the entry can be located within the disk file system;
wherein the system further comprises a network interface coupled to a communications medium; and
wherein receiving the naming request includes obtaining the naming request over the network interface, the naming request originating from a computer configured to send the naming request over the communications medium.

10. A system as in claim 9,
wherein the directory of the disk file system is configured to allow names to conform to multiple naming protocols;
wherein the controlling circuitry is further constructed and arranged to:
receive a request from a user to obtain a second name that identifies the entry, the second name conforming to a second naming protocol that is different from the first naming protocol;

in response to the request, produce the second name from the unique numeric identifier; and
send the second name to the user.

11. A system as in claim 10,
wherein producing the second name from the unique numeric identifier includes:
applying a transformation function to the entry to produce a numeric value, and
performing a translation operation of the numeric value to output the second name.

12. A system as in claim 11,
wherein performing the translation operation of the numeric value includes:
splitting the numeric value into a fixed number of numeric segments, each numeric segment having a particular number of bits;
mapping each numeric segment to a single character of a set of characters; and
concatenating characters of the set of characters to which the numeric segments were mapped to produce concatenated characters.

13. A system as in claim 12,
wherein splitting the numeric value into the fixed number of numeric segments includes:
providing each numeric segment of the fixed number of numeric segments with the particular number of bits, the number of bits being equal to the greatest integer less than the bit length of the hash value divided by the fixed number of hash segments; and
wherein performing the translation operation of the hash value further includes:
generating a set of remainder bits, the number of remainder bits in the set of remainder bits being equal to the remainder obtained from dividing the bit length of the hash value by the fixed number of numeric segments,
mapping each remainder bit of the set of remainder bits to one of a pair of remainder characters to produce a set of mapped remainder bits, and
concatenating the mapped remainder bits of the set of remainder bits to the concatenated characters to produce a fully mapped word, the second name including the fully mapped word.

14. A system as in claim 13:
wherein the controlling circuitry is further constructed and arranged to:
receive a second naming request to access the directory object, the second naming request including the second name;
in response to the second naming request, apply an inverse mapping to the fully mapped word of the second name to produce the numeric value,
locate the entry of the directory of the disk file system from the numeric value, the unique numeric key of the entry being encoded within the numeric value, and
obtain, as a record of the entry, the inode number associated with the directory object.

15. A computer program product having a non-transitory, computer-readable storage medium which stores code to provide access to directory objects of a disk file system directory of a disk, the code including instructions to:
receive a naming request to create an entry of the directory of the disk file system, the naming request including a name identifying a directory object, the name conforming to a particular naming protocol; and
produce, from the name, the entry of the directory of the disk file system, the entry having a unique numeric identifier, the unique numeric identifier being a key associated with the particular naming protocol by which the entry can be located within the disk file system;
wherein receiving the naming request includes obtaining the naming request over a network, the naming request originating from a computer configured to send the naming request over the network.

16. A computer program product as in claim 15,
wherein the directory of the disk file system is configured to allow names to conform to multiple naming protocols;
wherein the code includes further instructions to:
receive a request from a user to obtain a second name that identifies the entry, the second name conforming to a second naming protocol that is different from the first naming protocol;
in response to the request, produce the second name from the unique numeric identifier; and
send the second name to the user.

17. A computer program product as in claim 16,
wherein producing the second name from the unique numeric identifier includes:
applying a transformation function to the entry to produce a numeric value, and
performing a translation operation of the numeric value to output the second name.

18. A computer program product as in claim 17,
wherein performing the translation operation of the numeric value includes:
splitting the numeric value into a fixed number of numeric segments, each numeric segment having a particular number of bits;
mapping each numeric segment to a single character of a set of characters; and
concatenating characters of the set of characters to which the numeric segments were mapped to produce concatenated characters.

19. A computer program product as in claim 18,
wherein splitting the numeric value into the fixed number of numeric segments includes:
providing each numeric segment of the fixed number of numeric segments with the particular number of bits, the number of bits being equal to the greatest integer less than the bit length of the hash value divided by the fixed number of hash segments; and
wherein performing the translation operation of the hash value further includes:
generating a set of remainder bits, the number of remainder bits in the set of remainder bits being equal to the remainder obtained from dividing the bit length of the hash value by the fixed number of numeric segments,
mapping each remainder bit of the set of remainder bits to one of a pair of remainder characters to produce a set of mapped remainder bits, and
concatenating the mapped remainder bits of the set of remainder bits to the concatenated characters to produce a fully mapped word, the second name including the fully mapped word.

20. A computer program product as in claim 19,
wherein the code includes further instructions to:
receive a second naming request to access the directory object, the second naming request including the second name;
in response to the second naming request, apply an inverse mapping to the fully mapped word of the second name to produce the numeric value, locate the entry of the directory of the disk file system from the numeric value, the unique numeric key of the entry being encoded within the numeric value, and obtain, as a record of the entry, the inode number associated with the directory object.

* * * * *